T. A. NELSON.
PRESSURE GAGE.
APPLICATION FILED MAY 13, 1910.
1,018,582.
Patented Feb. 27, 1912.
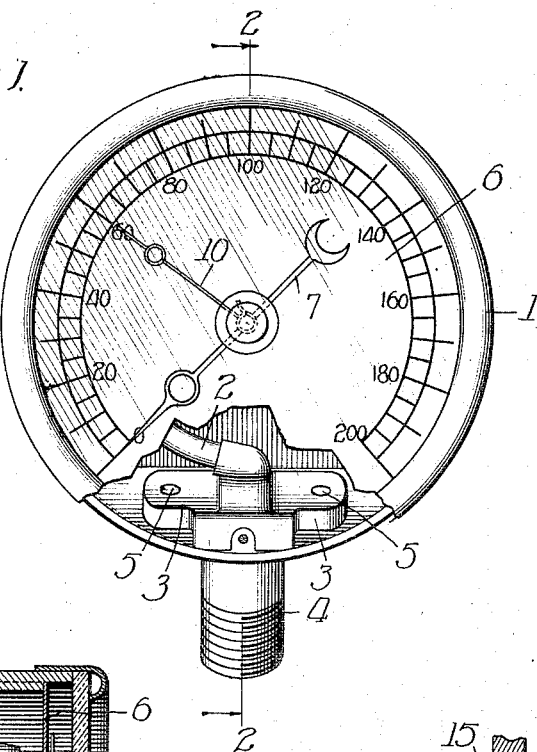
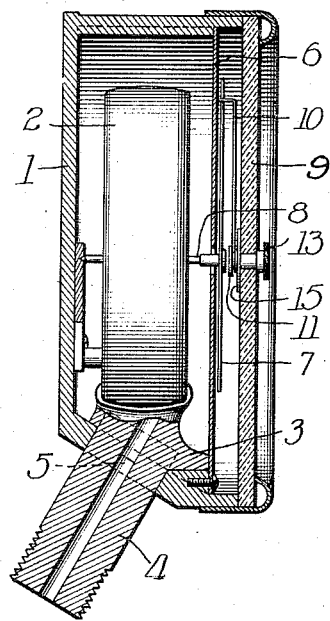
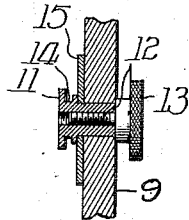
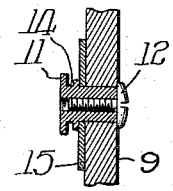
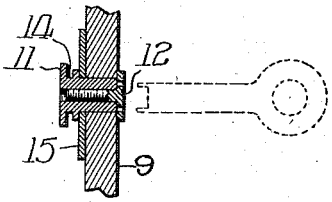
Witnesses:
Robert N. Weir
W. Perry Halin
Inventor:
Thomas A. Nelson
Jones, Addington, Ames & Siebold
Attys.

UNITED STATES PATENT OFFICE.

THOMAS A. NELSON, OF CHICAGO, ILLINOIS.

PRESSURE-GAGE.

1,018,582.      Specification of Letters Patent.      Patented Feb. 27, 1912.

Application filed May 13, 1910. Serial No. 561,140.

*To all whom it may concern:*

Be it known that I, THOMAS A. NELSON, a citizen of the United States, residing at Chicago, in the county of Cook and State of Illinois, have invented new and useful Improvements in Pressure-Gages, of which the following is a full, clear, concise, and exact description, reference being had to the accompanying drawings, forming a part of this specification.

My invention relates to an improvement in gages, and particularly pressure gages of the Bourdon tube type.

It is one of the objects of my invention to provide a gage which may be readily read from any position in which it is placed, and furthermore to provide an improved form of maximum pressure indicator for said gage.

Other objects and advantages in my gage will appear more fully in the appended specifications.

For the purpose of describing my invention, I have illustrated in the accompanying drawings one embodiment thereof.

In said drawings, Figure 1 is a front elevation of a gage embodying my improvements, a portion of the face thereof being broken away. Fig. 2 is a sectional view taken on the line 2—2 of Fig. 1. Fig. 3 is a detailed section of the supporting shaft for the maximum pressure indicator. Fig. 4 is a detailed modification thereof. Fig. 5 is still another detailed section of the modification thereof.

In the embodiment of the invention illustrated in the accompanying drawings, I provide a suitable casing (1), in which is arranged the usual Bourdon tube (2), which is connected with the operating mechanism for the indicator. As this mechanism takes the usual form and is well known, I have not illustrated the same in the accompanying drawings.

The tube is secured to a suitable base member (3), having a downward extension (4), which extension serves to connect the gage to the pressure pipe. It will be noticed that this extension has a rearward inclination, so that, when the gage is connected to a pipe, the gage will be supported at an angle, whereby the face may be more easily seen. This extension (4) passes through an opening formed in the casing, and the base member (3) is secured in position in the casing by screws (5), which extend through openings in the casing drilled parallel with the extension (4). These screws may be if desired countersunk in the casing, and the countersink so arranged that the inner ends of the screws will have a tendency to draw together, whereby the base member will be properly alined and the tube held in proper alinement with the operating mechanism for the indicator.

The casing (1) is provided with the usual indicator face (6), having suitable indicia thereon for indicating the pressure, and arranged on the front of the face is a pressure indicator (7), which is mounted on the shaft (8) of the operating mechanism, whereby, when the tube (2) responds to variations in pressure, the indicator (7) will show these variations on the face.

Arranged over the face is a protecting glass (9) and secured upon this glass is a maximum pressure indicator (10). This indicator is preferably secured in position upon a rotatable stud (11), which is arranged upon the rear of the glass and is secured in position by a screw (12) extending through the glass and into the stud, which screw is provided with a knurled head (13). The stud (11) is provided with annular shoulders to form a groove (14), and interposed between the front shoulder and the back of the glass is a washer (15). The maximum pressure indicator hand (10) is formed of thin wire which is secured in position on the stud by winding the lower end thereof around the stud in the channel (14).

In Fig. 4 I have shown a different form of the screw (12), in which, instead of providing a knurled head, as shown in Fig. 3, I have provided a screw head. In Fig. 5 I have shown still another modification of the head for the screw (12) which fits close up to the glass and is preferably provided with a pair of openings in the front face thereof, adapted to be engaged by a small spanner wrench suitably constructed for rotating the same.

By the arrangement of the stud (11) and its securing screw, I am enabled to set the maximum pressure indicator at any position desired from the exterior of the casing and without removing the front glass.

While I have shown and described certain embodiments of my invention in the accompanying drawings and specification, it will be understood that various modifications and changes may be made therein without departing from the spirit of my invention as set forth in the accompanying claims.

Having thus described my invention, what I claim as new and desire to secure by Letters Patent of the United States is:

1. In a pressure gage, the combination with a dial plate and an indicating hand, of a protecting glass for said dial plate, a stud extending through said protecting glass having on its inner end an annular groove and a maximum pressure indicator comprising a wire stem having its lower end wrapped around said stud and in said groove.

2. In a pressure gage, the combination with a dial plate and indicating hand, of a protecting glass for said dial plate, a stud extending through said protecting glass and having on its inner end an annular groove, a maximum pressure indicator comprising a wire finger having the lower end thereof wrapped around said stud in said groove, said stud having formed therein a screw-threaded socket, and a headed screw engaging in said socket and having its head engaging the front of the protecting glass, for holding said stud in position and for rotating the same.

3. In a pressure gage, the combination with a casing having a flattened portion extending at an angle less than a right angle thereto, of a supporting member extending through said flattened portion of the casing and having connecting flanges connected to the flattened portion of said casing on the inner side thereof.

4. In a pressure gage, the combination with a casing of a Bourdon tube arranged in said casing, said casing having a flattened portion extending at an angle less than a right angle to the rest of the casing, and a supporting member extending through said casing having connecting flanges arranged on the inner side of said casing and connected thereto, by means of screws passing through said casing and flanges, parallel with the supporting member, the Bourdon tube being mounted on said supporting member.

In witness whereof, I have hereunto subscribed my name in the presence of two witnesses.

THOMAS A. NELSON.

Witnesses:
W. PERRY HAHN,
E. R. KING.